United States Patent
Suzuki et al.

(10) Patent No.: US 8,948,991 B2
(45) Date of Patent: Feb. 3, 2015

(54) LEFT-RIGHT WHEEL DRIVE FORCE DISTRIBUTION CONTROL APPARATUS FOR A VEHICLE

(75) Inventors: Shinichi Suzuki, Kawasaki (JP); Yuuki Ozawa, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 147 days.

(21) Appl. No.: 13/806,684

(22) PCT Filed: Jul. 5, 2011

(86) PCT No.: PCT/JP2011/065397
§ 371 (c)(1),
(2), (4) Date: Dec. 21, 2012

(87) PCT Pub. No.: WO2012/005263
PCT Pub. Date: Jan. 12, 2012

(65) Prior Publication Data
US 2013/0103278 A1    Apr. 25, 2013

(30) Foreign Application Priority Data

Jul. 9, 2010 (JP) ................................. 2010-156665

(51) Int. Cl.
*B60K 17/34* (2006.01)
*B60W 10/12* (2012.01)
(Continued)

(52) U.S. Cl.
CPC ............. *B60W 30/045* (2013.01); *F16H 48/19* (2013.01); *B60K 23/0808* (2013.01);
(Continued)

(58) Field of Classification Search
CPC ........... B60K 2023/043; B60W 10/16; B60W 30/045; B60W 2720/14; B60W 2710/12–2710/125; B60W 2520/14; B60W 2720/406; B60G 2800/244–2800/246
USPC .................................. 701/7, 70; 180/245–249
See application file for complete search history.

(56) References Cited

U.S. PATENT DOCUMENTS

| 5,105,901 | A | 4/1992 | Watanabe |
| 6,033,337 | A | 3/2000 | Ohkuma et al. |

(Continued)

FOREIGN PATENT DOCUMENTS

| JP | 07-017277 | 1/1995 |
| JP | 9-20217 | 1/1997 |

(Continued)

OTHER PUBLICATIONS

Extended European Search Report for the corresponding European patent application No. 11803597.1 issued on Jun. 18, 2014.

*Primary Examiner* — Calvin Cheung
*Assistant Examiner* — Courtney Heinle
(74) *Attorney, Agent, or Firm* — Global IP Counselors, LLP (57) ABSTRACT

Upon determining than an over-steered state exits, a feedback control coefficient for a rear wheel total drive force is set to 0 and a feedback control coefficient for a rear wheel drive force difference is also set to 0 to impose a two-wheel drive state. As a result, it is possible to avoid a turn cruising instability caused by cruising in four-wheel drive in an over-steered state. Upon determining that an under-steered state exists, the feedback control coefficients are set such that four-wheel drive is allowed but a drive force difference is not set between the left and right rear wheels. As a result, when the under-steered state exists, excellent traction can be enjoyed by operating in four-wheel drive and the phenomenon of riding up a canted road surface due to a drive force difference set between the left and right rear wheels can be avoided.

4 Claims, 6 Drawing Sheets

(51) Int. Cl.
  B60W 30/045 (2012.01)
  F16H 48/19 (2012.01)
  B60K 23/08 (2006.01)
  *B60K 17/344* (2006.01)
  *B60W 10/16* (2012.01)
  *F16H 48/20* (2012.01)
  *B60K 17/35* (2006.01)

(52) U.S. Cl.
  CPC ............. *B60K 17/344* (2013.01); *B60W 10/16* (2013.01); *B60W 2720/403* (2013.01); *B60W 2720/406* (2013.01); *F16H 2048/205* (2013.01); *B60K 17/3515* (2013.01)
  USPC ............................................. 701/70; 180/248

(56) References Cited

U.S. PATENT DOCUMENTS

| | | |
|---|---|---|
| 2007/0112497 A1 | 5/2007 | Miura |
| 2007/0184929 A1* | 8/2007 | Piyabongkarn et al. ........ 475/84 |
| 2007/0192011 A1* | 8/2007 | Piyabongkarn et al. ........ 701/70 |
| 2009/0037053 A1 | 2/2009 | Yamazaki |

FOREIGN PATENT DOCUMENTS

| | | |
|---|---|---|
| JP | 2003-231428 | 8/2003 |
| JP | 2006-7984 | 1/2006 |
| JP | 2007-131229 | 5/2007 |
| WO | 2010/070725 | 6/2010 |

* cited by examiner

LEFT-RIGHT WHEEL DRIVE FORCE DISTRIBUTION CONTROL APPARATUS FOR A VEHICLE

CROSS-REFERENCE TO RELATED APPLICATIONS

This application is a U.S. National stage application of International Application No. PCT/JP2011/065397, filed Jul. 5, 2011, which claims priority claims priority under to Japanese Patent Application No. 2010-156665, filed in Japan on Jul. 9, 2010, the entire contents of which is hereby incorporated by reference.

BACKGROUND

1. Field of the Invention

The present invention generally relates to a drive force distribution control device for a four-wheel drive vehicle that can transmit a portion of a drive force headed toward a main drive wheel to a subordinate drive wheel in accordance with a control and can execute a distributed output of said portion of the drive force to a left subordinate drive wheel and a right subordinate drive wheel in accordance with a control.

2. Background Information

Japanese Laid-Open Patent Application Publication No. 07-017277 presents an example of a conventional drive force distribution control device for a four-wheel drive vehicle. The proposed technology compares a yaw rate corresponding to a turning behavior of the vehicle to a target yaw rate. If an over-steered state exists, then a drive force difference is imposed between turning-direction outside and turning-direction inside wheels such that an excessively large actual yaw rate is decreased and brought closer to a target yaw rate. If an under-steered state exists, then a drive force difference is imposed between turning-direction outside and turning-direction inside wheels such that an excessively small actual yaw rate is increased and brought closer to a target yaw rate.

With this conventional drive force distribution control, the actual yaw rate can be made to converge toward the target yaw rate using feedback control of the yaw rate even if the actual yaw rate has diverged from the target yaw rate.

SUMMARY

With the conventional drive force distribution control just explained, when an over-steered state exists, the excessively large actual yaw rate is decreased and brought closer to the target yaw rate by increasing the drive force of the turning-direction inside wheel. Meanwhile, when an under-steered state exists, the excessively small actual yaw rate is increased and brought closer to the target yaw rate by increasing the drive force of the turning-direction outside wheel.

That is, when an over-steered state exists, the wheel load of the turning-direction inside wheel decreases due to load shifting and the turning-direction inside wheel enters a state in which it slips more easily and cannot transmit a large drive force. Since the conventional control ignores this fact and increases the drive force of the turning-direction inside wheel during over-steering, the increased drive force cannot be reliably transmitted by the turning-direction inside wheel and the expected effect cannot be obtained. To the contrary, a problem is incurred in that the turning-direction inside wheel undergoes drive slippage and the turning stability of the vehicle is damaged.

On a so-called canted road surface that is slanted in a vehicle widthwise direction, if a driver is imposing a steering angle to counterbalance a vehicle yaw rate caused by the slant of the road surface (to prevent an actual yaw rate from occurring in the vehicle), then a comparison of a target yaw rate found based on the steering operation and the actual yaw rate will yield a determination that the vehicle is in an under-steered state because a yaw rate is not occurring even though the steering wheel is being turned. When it is determined that an under-steered state exists, the conventional drive force distribution control increases the drive force of the steering direction outside wheel so as to generate a yaw rate equal to the target yaw rate from the state in which no yaw rate exists and, consequently, a yaw moment tending to cause the vehicle to ride up the canted road surface acts on the vehicle.

However, the driver operated the steering to counterbalance the vehicle yaw rate caused by the slant of the canted road surface, not to execute a turn. Therefore, it is a troublesome problem for the driver if the control imposes a yaw moment tending to cause the vehicle to ride up the canted road surface and changes the advancement path of the vehicle in a corresponding direction.

The present invention was conceived in view of these circumstances and its object is to provide a drive force distribution control device for a four-wheel drive vehicle that can solve the aforementioned problems by building on the conclusion that it is better not to execute a control of drive force difference between the inside and outside wheels when it is determined that the vehicle is in an over-steered state or an under-steered state based on a comparison of the target yaw rate and the actual yaw rate.

In order to achieve the object, a four-wheel drive vehicle drive force distribution control device according to the present invention can transmit a portion of a drive force headed toward a main drive wheel to a subordinate drive wheel in accordance with a control and executes a distributed output of the total drive force transmitted to the subordinate drive wheel such that the total drive force is distributed between a left and a right subordinate drive wheel in accordance with a control. The drive force distribution control device is characterized by being provided with an over-steering determining means, an over-steering left-right drive force difference control means, an under-steering determining means, and an under-steering left-right drive force difference control means.

The over-steering determining means determines if the vehicle is in an over-steered state in which an actual turning behavior is excessive in comparison with a target turning behavior computed based on a vehicle operating state, and the over-steering left-right drive force difference control means sets the drive force difference between the left and right subordinate drive wheels to 0 when the over-steering determining means determines that the vehicle is in an over-steered state.

Meanwhile, the under-steering determining means determines if the vehicle is in an under-steered state in which the actual turning behavior is insufficient in comparison with the target turning behavior, and the under-steering left-right drive force difference control means sets the drive force difference between the left and right subordinate drive wheels to 0 when the under-steering determining means determines that the vehicle is in an under-steered state.

The four-wheel drive vehicle drive force distribution control according to the present invention is configured to set the drive force difference between the left and right subordinate drive wheels to 0 when a comparison of the target turning behavior and the actual turning behavior yields a determination that the vehicle is in an over-steered state or an under-steered state. The effects obtained as a result will now be explained.

When the vehicle is determined to be over-steered, the wheel load of the subordinate drive wheel located on the inside with respect to the turning direction decreases and a large drive force is not directed to that subordinate drive wheel. Consequently, drive slippage is not caused by transmitting a large drive force to the subordinate drive wheel where the wheel load has decreased and the problem of damaging the turning stability of the vehicle with drive slippage can be avoided.

As a result, even if an under-steered state is mistakenly determined to exist when the driver is operating the steering to counterbalance a vehicle turning behavior caused by the slant of a canted road, a yaw moment tending to cause the vehicle to ride up the canted road surface is not produced by increasing the drive force of the steering direction outside wheel and the problem of changing the advancement path of the vehicle in a direction corresponding to such a yaw moment against the intent of the driver can be avoided.

BRIEF DESCRIPTION OF THE DRAWINGS

Referring now to the attached drawings which form a part of this original disclosure.

DETAILED DESCRIPTION OF THE EMBODIMENTS

Embodiments of the present invention are described in detail below with reference to the embodiments in the drawings.

Figure 1:
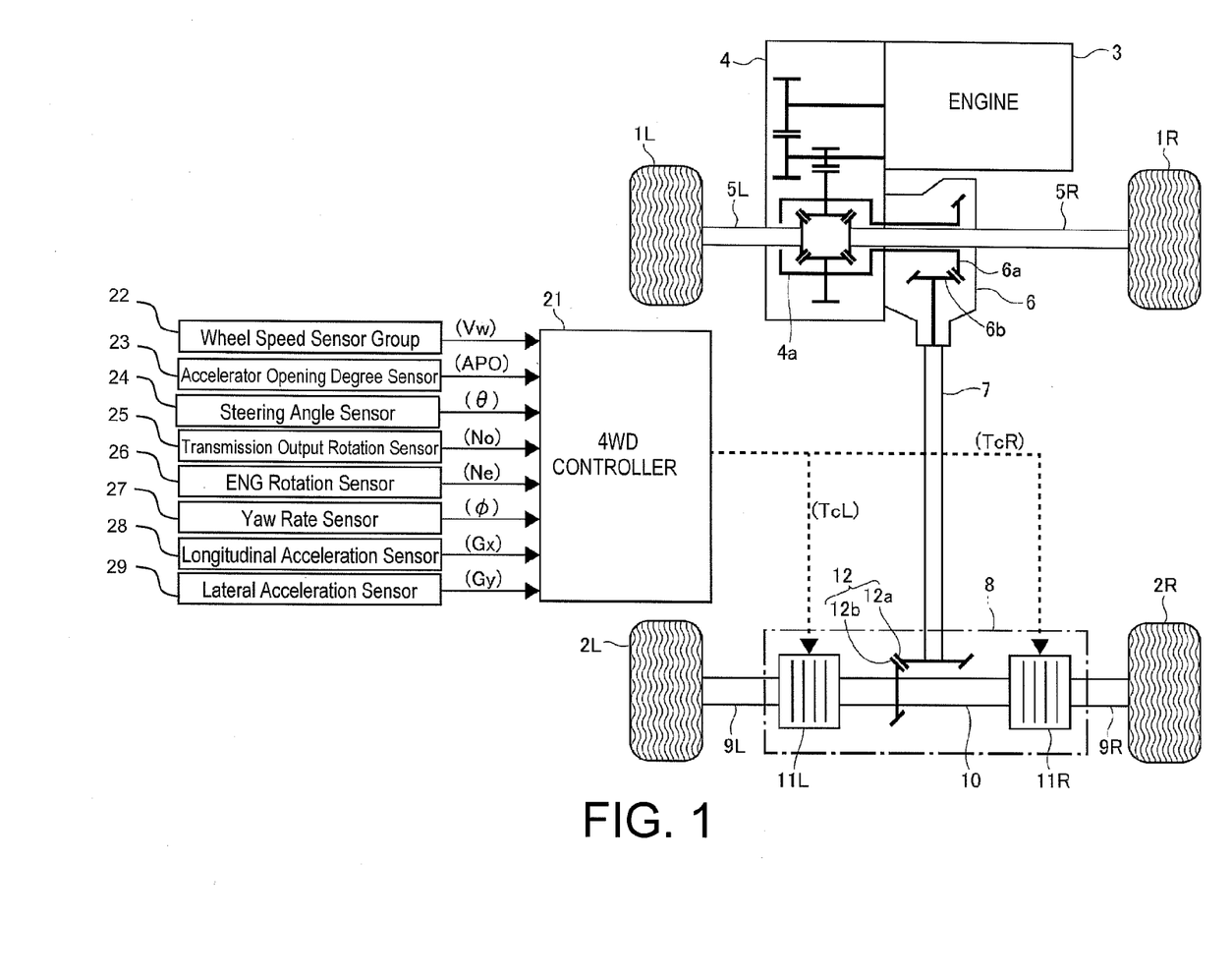
FIG. 1 is a schematic plan view showing a wheel drive train of a four-wheel drive vehicle equipped with a drive force distribution control apparatus according to an embodiment of the present invention as viewed from above the vehicle. A four-wheel drive control system is also shown.

FIG. 1 is a schematic plan view showing a wheel drive train of a four-wheel drive vehicle equipped with a drive force distribution control apparatus according to an embodiment of the present invention as viewed from above the vehicle. A four-wheel drive control system is also shown. The figure shows left and right front wheels 1L and 1R serving as main drive wheels and left and right rear wheels 2L and 2R serving as subordinate drive wheels. In this patent specification, the term "drive force" refers not to power but to a torque value.

The reference numeral 3 indicates an engine serving as prime mover. Torque from the engine 3 is multiplied by a transmission 4 (transaxle that includes a differential gear device 4a) and transferred toward the left and right front wheels 1L and 1R through left and right axle shafts 5L and 5R, thereby serving to drive the left and right front wheels 1L and 1R.

A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6a is coupled to a differential gear case serving as an input rotary member of the differential gear device 4a such that the input hypoid gear rotates together with the differential gear case. The output hypoid gear 6b is coupled to a front end of the propeller shaft 7, and the propeller shaft 7 is arranged to extend rearward toward a left-right rear wheel drive force distributing unit 8.

The transfer case 6 sets a gear ratio of the bevel gear set comprising the hypoid gear 6a and the output hypoid gear 6b such that a portion of a drive force heading toward the left and right front wheels 1L and 1R is converted to a higher rotational speed and outputted toward the propeller shaft 7.

The high-speed rotational power outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between the axle shafts 9L and 9R of the left and right rear wheels 2L and 2R and extends along the axial direction of the shafts 9L and 9R. The left-right rear wheel drive force distributing unit 8 also has a left rear wheel clutch (left subordinate drive wheel friction element) 11 L and a right rear wheel clutch (right subordinate drive wheel friction element) 11 R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 provides a drive connection between the center shaft 10 and a rearward end of the propeller shaft 7 extending rearward from the transfer case 6. The final reduction gear 12 comprises an input hypoid gear 12a and an output hypoid gear 12b.

The reduction gear ratio of the final reduction gear 12 is set in relation to the speed-increasing gear ratio of the transfer case 6 (speed increasing gear ratio resulting from the bevel gear set comprising the hypoid gear 6a and the output hypoid gear 6b) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel during the turn will rotate at a higher rotational speed than the center shaft 10. Under such conditions, if the clutch 11L (or 11 R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously and the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R.

While this is occurring, a portion of the drive force heading toward the left and right front wheels 1L and 1R is transferred successively from the transfer case 6 to the propeller shaft 7, to the final reduction gear 12, and to the center shaft 10 at an increased rotational speed. The holding forces of the clutches 11L and 11R are controlled such that the clutches 11L and 11 R slip in accordance with the amount of rotational speed increase while the left and right rear wheels 2L and 2R are driven. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. In order to further the performance of this four-wheel drive vehicle when starting into motion from a stopped condition and when accelerating, the vehicle is further configured such that a front-rear wheel drive force distribution control can be executed by controlling a total holding force of the left wheel clutch 11L and the right wheel clutch 11R. Additionally, in order to improve a turning performance of the vehicle and execute a behavior control such that an actual behavior (actual yaw rate, etc.) of the vehicle matches a target based on an operating state and a traveling condition of the vehicle, a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11 R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11 R such that the holding forces of the clutches 11L and 11R correspond to target drive forces TcL and TcR of the left and right rear wheels 2L and 2R, respectively, which are computed as will be explained later.

In order to compute a target drive force TcL of the left wheel 2L and a target drive force TcR of the right wheel, the four-wheel drive controller 21 receives the following input signals: a signal from a wheel speed sensor group 22 that a wheel speed Vw of each of the wheels 1L, 1R, 2L, and 2R; a signal from an accelerator opening degree sensor 23 that detects an accelerator opening degree APO as an accelerator pedal depression amount; a signal from a steering sensor 24 that detects a steering wheel steering angle θ; a signal from a transmission output rotation sensor 25 that detects a transmission output rotational speed No; a signal from an engine rotation sensor 26 that detects an engine rotational speed Ne; a signal from a yaw rate sensor 27 that detects a yaw rate φ about a vertical axis passing through a center of gravity of the vehicle; a signal from a longitudinal acceleration sensor 28 that detects a longitudinal acceleration Gx of the vehicle; and a lateral acceleration signal 29 that detects a lateral acceleration Gy of the vehicle.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11 R such that the drive forces of the left and right rear wheels 2L and 2R match the target drive forces TcL and TcR.

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained.

Figure 2:
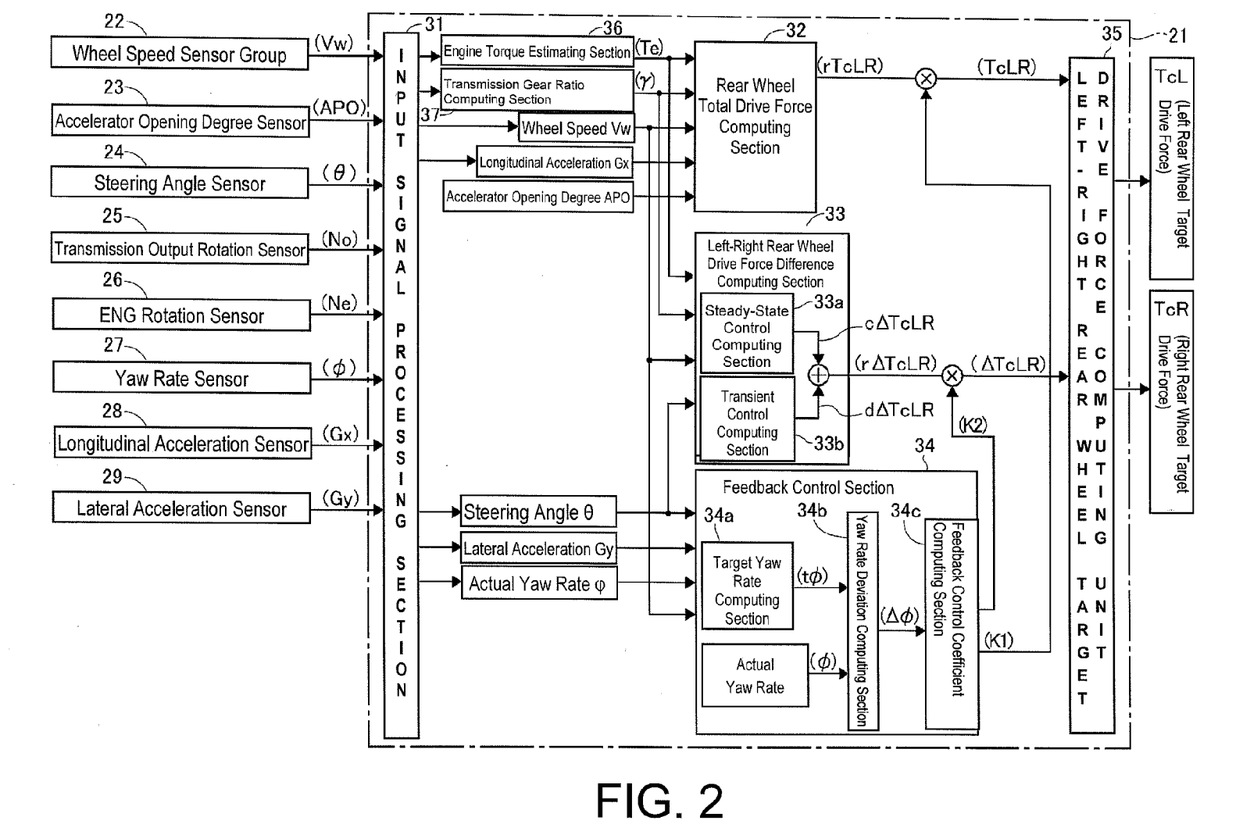
FIG. 2 is a function-specific block diagram of the four-wheel drive controller shown in FIG. 1.

As shown in function-specific block diagram of FIG. 2, the four-wheel drive controller 21 comprises an input signal processing section 31, a rear wheel total drive force computing section 32, a left-right rear wheel drive force difference computing section 33, a feedback control section 34, and a left-right rear wheel target drive force computing section 35.

The input signal processing section 31 removes noise from the detection signals of the wheel speed sensor group 22, the accelerator opening degree sensor 23, the steering angle sensor 24, the transmission output rotation sensor 25, the engine rotation sensor 26, the yaw rate sensor 27, the longitudinal acceleration sensor 28, and the lateral acceleration sensor 29 and pre-processes the signals such that they can be used in computations that will be explained later. Among these pre-processed signals, the engine rotational speed Ne and the accelerator opening degree APO are used by an engine torque estimating section 36 to estimate an engine torque Te, and the engine rotational speed Ne and the transmission output rotational speed No are used by a transmission gear ratio computing section 37 to compute a transmission gear ratio γ.

An example of how the rear wheel total drive force computing section 32 computes a total drive force target value rTcLR (hereinafter called "total drive force rTcLR") for the left and right rear wheels 2L and 2R will now be explained. First, the drive force computing section 32 computes an input torque Ti to the differential gear device 4a based on the engine torque Te and the transmission gear ratio y. Next, the computing section 32 calculates left-right front wheel average speed and a left-right rear wheel average speed based on signals (wheel speeds Vw) from the wheel speed sensor group 22 and determines a degree of drive slippage of the left and right front wheels 1L and 1R (rotation difference between front and rear wheels) estimated by comparing the two average speeds. The computing section 32 also determines how much of the input torque Ti to direct toward the left and right rear wheels 2L and 2R in accordance with the degree of drive slippage, the longitudinal acceleration Gx, and the accelerator opening degree APO and sets that amount as a total drive force rTcLR to be directed to the rear wheels.

The larger the aforementioned front wheel slippage is, the larger the total drive force rTcLR to be directed to the rear wheels needs to be in order to suppress the slippage. Meanwhile, the larger the longitudinal acceleration Gx and the accelerator opening degree APO are, the larger the drive force requested by the driver is and the larger the total drive force rTcLR directed to the rear wheels needs to be in order to satisfy the request.

The left-right rear wheel drive force difference computing section 33 has a steady-state control computing section 33a and a transient control computing section 33b and calculates a drive force difference target value rΔTcLR (hereinafter called drive force difference rΔTcLR) between the left and right rear wheels 2L and 2R as, for example, will now be explained.

The steady-state control computing section 33a calculates a left-right rear wheel drive force difference steady-state control amount cΔTcLR for achieving a vehicle turning behavior requested by a driver in a steady manner as will now be explained. The steady-state control computing section 33a estimates a longitudinal acceleration rate Gx of the vehicle based on the engine torque Te and the transmission gear ratio γ and a lateral acceleration rate Gy of the vehicle based on a steering angle θ and a vehicle speed VSP. An under-steering state (state in which an actual turning behavior is insufficient in relation to a target turning behavior) can be ascertained based on a combination of the estimated longitudinal acceleration rate Gx and the lateral acceleration rate Gy. The steady-state control computing section 33a determines a left-right rear wheel drive force difference necessary to resolve the under-steering state as a left-right rear wheel drive force steady-state control amount cΔTcLR. The reason estimated values of the longitudinal acceleration rate Gx and the lateral acceleration rate Gy are used instead of detected values is that the steady-state control computing section 33a is a feed forward control system and an estimated value matches the actual state of the control better than a detected value, which is a result value.

Thus, while the steering angle θ is near 0 (while the wheels are not being turned), the left-right rear wheel drive force difference steady-state control amount cΔTcLR is held at 0 because the lateral acceleration rate Gy equals 0. Conversely, while the steering angle θ is not near 0 (while the wheels are being turned), the lateral acceleration rate Gy increases as the steering angle θ and the vehicle speed VSP increase and there is a strong tendency for the vehicle to experience understeering. Consequently, the left-right rear wheel drive force difference steady-state control amount cΔTcLR increases. Furthermore, as the longitudinal acceleration rate Gx increases, the tendency for the vehicle to experience understeering strengthens and the left-right rear wheel drive force difference steady-state control amount cΔTcLR increases.

The transient control computing section 33b calculates a left-right rear wheel drive force difference transient control amount dΔTcLR for achieving a turning response requested by a driver in a transient manner due to the change rate of the steering angle θ while traveling at the current vehicle speed VSP. More specifically, the transient control computing section 33b computes a target yaw rate tφ desired by the driver based on the wheel speeds Vw (vehicle speed) and the steering angle θ and sets an upper limit of the target yaw rate tφ based on the lateral acceleration Gy. A change rate dtφ of the target yaw rate tφ is computed by differentiating the target yaw rate tφ, and the change rate dtφ of the target yaw rate tφ is used to execute a map search to find the left-right rear wheel drive force difference transient control amount dΔTcLR (which is a target value for the turning response transiently requested by the driver).

The left-right rear wheel drive force difference transient control computation value ddΔTcLR is set to be larger when the change rate dtφ of the target yaw rate tφ is higher because a higher turning response is desired when the change rate dtφ is higher. The reason a change rate dtφ of the target yaw rate tφ is used instead of a change rate of a yaw rate detection value 4) is that the transient control computing section 33b is a feed forward control system and the target yaw rate tφ (which is an estimated value) matches the actual state of the control better than a detected value φ (which is a result value).

The left-right rear wheel drive force difference computing section 33 calculates a sum value of the left-right rear wheel drive force difference steady-state control amount cΔTcLR calculated by the steady-state control computing section 33a as explained previously and the left-right rear wheel drive force difference transient control amount dΔTcLR calculated by the transient control computing section 33b as explained previously and sets the sum value as a left-right rear wheel drive force difference rΔTcLR to serve as a target during the vehicle turning behavior.

However, there are situations in which the actual turning behavior (actual yaw rate φ) actually exhibited by the vehicle in response to the left-right rear wheel drive force difference rΔTcLR is affected by a lateral wind or other external disturbance and does not match the target turning behavior (target yaw rate tφ) requested through the steering operation performed by the driver. When the actual yaw rate φ and the target yaw rate tφ do not match, the feedback control section 34 revises the rear wheel total drive force rTcLR and the rear wheel drive force difference rΔTcLR as explained below such that a final rear wheel total drive force TcLR and rear wheel drive force difference ΔTcLR are obtained.

The feedback control section 34 comprises a target yaw rate computing section 34a, a yaw rate deviation computing section 34b, and a feedback control coefficient computing section 34c. The target yaw rate computing section 34a computes the target yaw rate tφ desired by the driver based on the steering angle θ, the lateral acceleration Gy, and the wheel speeds Vw. The yaw rate deviation computing section 34b and the feedback control coefficient computing section 34c execute the control program shown in FIG. 3 and set a feedback control coefficient K1 (0 or 1) for the rear wheel total drive force rTcLR and a feedback control coefficient K2 (0 or 1) for the rear wheel drive force difference rΔTcLR.

The feedback control coefficient K1 is multiplied by the rear wheel total drive force rTcLR to calculate a revised final rear wheel total drive force TcLR, and the feedback control coefficient K2 is multiplied by the rear wheel drive force difference rΔTcLR to calculated a revised final rear wheel drive force difference ΔTcLR.

Figure 3:
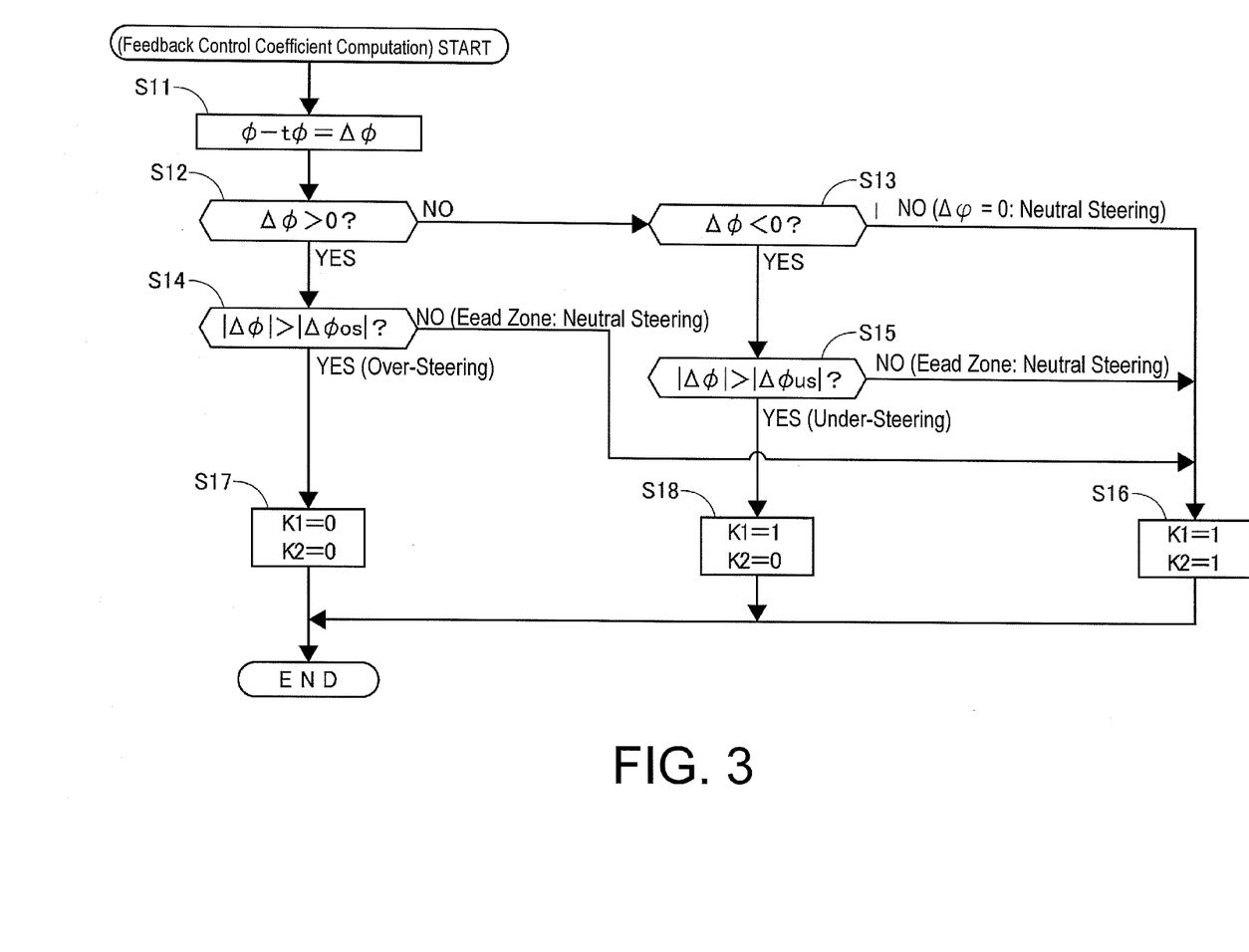
FIG. 3 is a flowchart showing a feedback control coefficient setting program executed by a yaw rate deviation computing section and a feedback control coefficient computing section shown in FIG. 2.

In step S11 of FIG. 3, the yaw rate deviation computing section 34b computes a yaw rate deviation Δφ(=φ−tφ) between the target yaw rate tφ computed by the computing section 34a as previously explained and a detected actual yaw rate φ.

In steps S12 to S15 of FIG. 3, the feedback control coefficient computing section 34c determines based on the yaw rate deviation Δφ if the vehicle is in an over-steered state in which the actual yaw rate φ is excessive with respect to the target yaw rate tφ by an amount exceeding a dead zone (φ>tφ+dead zone), an under-steered state in which the actual yaw rate φ is insufficient with respect to the target yaw rate tφ by an amount exceeding a dead zone (φ>−dead zone), or a neutral steering state in which the actual yaw rate φ is neither excessive nor insufficient (t$\phi$−dead zone≤$\phi$≤t$\phi$+dead zone). In steps S16 to S18, the feedback control coefficient computing section 34c sets the feedback control coefficients K1 and K2 based on the result of this steering state determination.

The steering state determination will now be explained. In step S12, the feedback control coefficient computing section 34c checks if the yaw rate deviation Δ$\phi$ is a positive value above a reference value 0 shown in FIG. 4, and in step S13, the feedback coefficient computing section 34c checks if the yaw rate deviation Δ$\phi$ is a negative value below the reference value 0 shown in FIG. 4.

Figure 4:
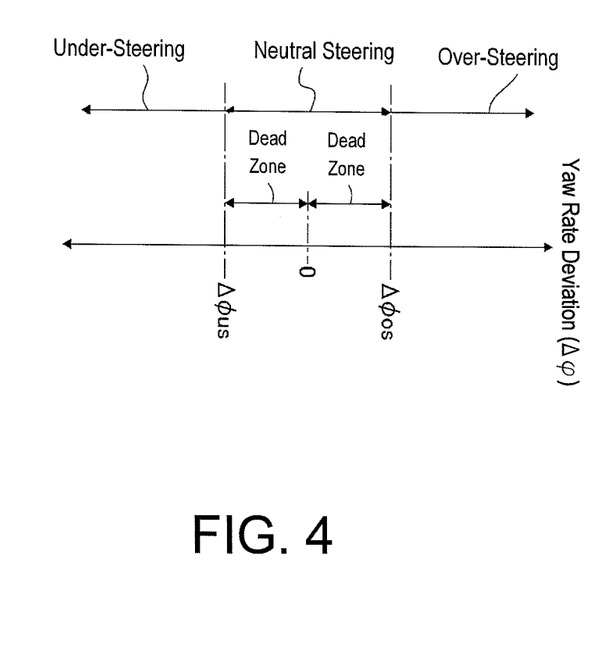
FIG. 4 is a region diagram showing an over-steering region, an under-steering region and a neutral steering region.

If the yaw rate deviation Δ$\phi$ is determined to be larger than 0 (Δ$\phi$>0) in step S12, then the computing section 34c proceeds to step S14 and checks if the actual yaw rate $\phi$ exceeds the target yaw rate t$\phi$ by an amount exceeding the dead zone exemplified in FIG. 4 ($\phi$>t$\phi$+dead zone), i.e., if an over-steered state exists, by determining if the absolute value of the yaw rate deviation |Δ$\phi$| is larger than the absolute value of an over-steering determination value |Δ$\phi$os| shown in FIG. 4. Thus, step S12 and step S14 correspond to the over-steering determining means mentioned in the claims.

If the yaw rate deviation Δ$\phi$ is determined to be smaller than 0 (Δ$\phi$<0) in step S13, then the computing section 34c proceeds to step S15 and checks if the actual yaw rate $\phi$ insufficient with respect to the target yaw rate t$\phi$ by an amount exceeding a dead zone exemplified in FIG. 4 ($\phi$>t$\phi$+dead zone), i.e., if an under-steered state exists, by determining if the absolute value of the yaw rate deviation |Δ$\phi$| is larger than the absolute value of an under-steering determination value |Δ$\phi$us| shown in FIG. 4. Thus, step S13 and step S15 correspond to the under-steering determining means mentioned in the claims.

The dead zone mentioned here corresponds, for example, to a yaw rate deviation Δ$\phi$, i.e., a change in the yaw rate of the vehicle, that is too small for the driver not to feel.

As shown in FIG. 4, the vehicle is determined to be in a neutral steering state, i.e., in neither an over-steered state nor an under-steered state, if the condition Δ$\phi$>0 is not determined to exist in step S12 and the condition Δ$\phi$<0 is not determined to exist in step S13, i.e., if the actual yaw rate $\phi$ and the target yaw rate t$\phi$ match and the yaw rate deviation Δ$\phi$ is zero (Δ$\phi$=0). The vehicle is also determined to be in a neutral steering state if the condition |Δ$\phi$|≤|Δ$\phi$us| is determined to exist in step S14 or the condition |Δ$\phi$|≤|Δ$\phi$us| is determined to exist in step S15, which would indicate that the actual yaw rate $\phi$ is not excessive or insufficient with respect to the target yaw rate t$\phi$ by an amount exceeding the dead zone (t$\phi$−dead zone≤$\phi$≤t$\phi$+dead zone), i.e., the yaw rate deviation Δ$\phi$ is within the dead zones (Δ$\phi$us−dead zone≤Δ$\phi$≤Δ$\phi$os+dead zone). If the vehicle is in the neutral steering state, then the computing section 34c proceeds to step S16 and sets the feedback control coefficient K1 for the rear wheel total drive force rTcLR to 1 as shown in FIG. 5 and also sets the feedback control coefficient K2 for the rear wheel drive force difference rΔTcLR to 1.

Setting the feedback control coefficient K1 to 1 causes the final rear wheel total drive force TcLR to be set as TcLR=rTcLR, and setting the feedback control coefficient K2 to 1 causes the final rear wheel drive force difference ΔTcLR set as ΔTcLR=rΔTcLR. This means the vehicle is operated in four-wheel drive in accordance with the computation results of the computing section 32 and the drive force difference between the left and right rear wheels is set according to the computation results of the computing section 33. As a result, in the neutral steering state, the excellent traction of four-wheel drive can be enjoyed and excellent turning response and turning stability can be achieved by providing a drive force difference between the left and right rear wheels.

Figure 5:
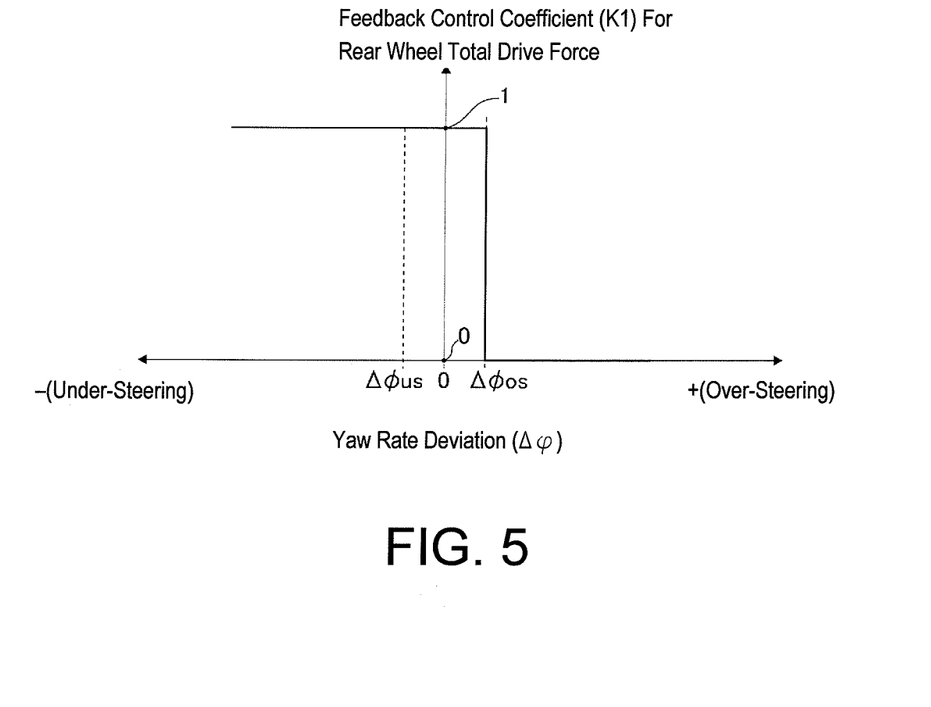
FIG. 5 is a characteristic diagram showing how a feedback control coefficient for a rear wheel total drive force is changed.

However, if the feedback control coefficient computing section 34c determines in step S14 that the vehicle is in the over-steered state (|Δ$\phi$|>|Δ$\phi$os|), then it proceeds to step S17, which corresponds to an over-steering left-right drive force difference control means, and sets the feedback control coefficient K1 for the rear wheel total drive force rTcLR to 0 as shown in FIG. 5 and also sets the feedback control coefficient K2 for the rear wheel drive force difference rΔTcLR to 0. Setting the feedback control coefficient K1 to 0 causes the final rear wheel total drive force TcLR to be 0, and setting the feedback control coefficient K2 to 0 causes the final rear wheel drive force difference ΔTcLR to be 0. This means the vehicle travels in two-wheel drive and, as a result, the harmful effects that could result from traveling in four-wheel drive while in an over-steered state can be eliminated, as will be explained in detail later.

Meanwhile, if the feedback control coefficient computing section 34c determines in step S15 that the vehicle is in the under-steered state (|Δ$\phi$|>|Δ$\phi$us|), then it proceeds to step S18, which corresponds to an under-steering left-right drive force difference control means, and sets the feedback control coefficient K1 for the rear wheel total drive force rTcLR to 1 as shown in FIG. 5 and sets the feedback control coefficient K2 for the rear wheel drive force difference rΔTcLR to 0. Setting the feedback control coefficient K1 to 1 causes the final rear wheel total drive force TcLR to be set as TcLR=rTcLR, and setting the feedback control coefficient K2 to 0 causes the revised final rear wheel drive force difference ΔTcLR to be 0, which means that the vehicle is operated in four-wheel drive according to the computation results of the computing section 32 but a drive force difference is not set between the left and right rear wheels. As a result, excellent traction can be enjoyed by operating in four-wheel drive while in an under-steered state and the harmful effects of setting a drive force difference between the left and right rear wheels can be eliminated as will be explained in detail later.

Figure 6:
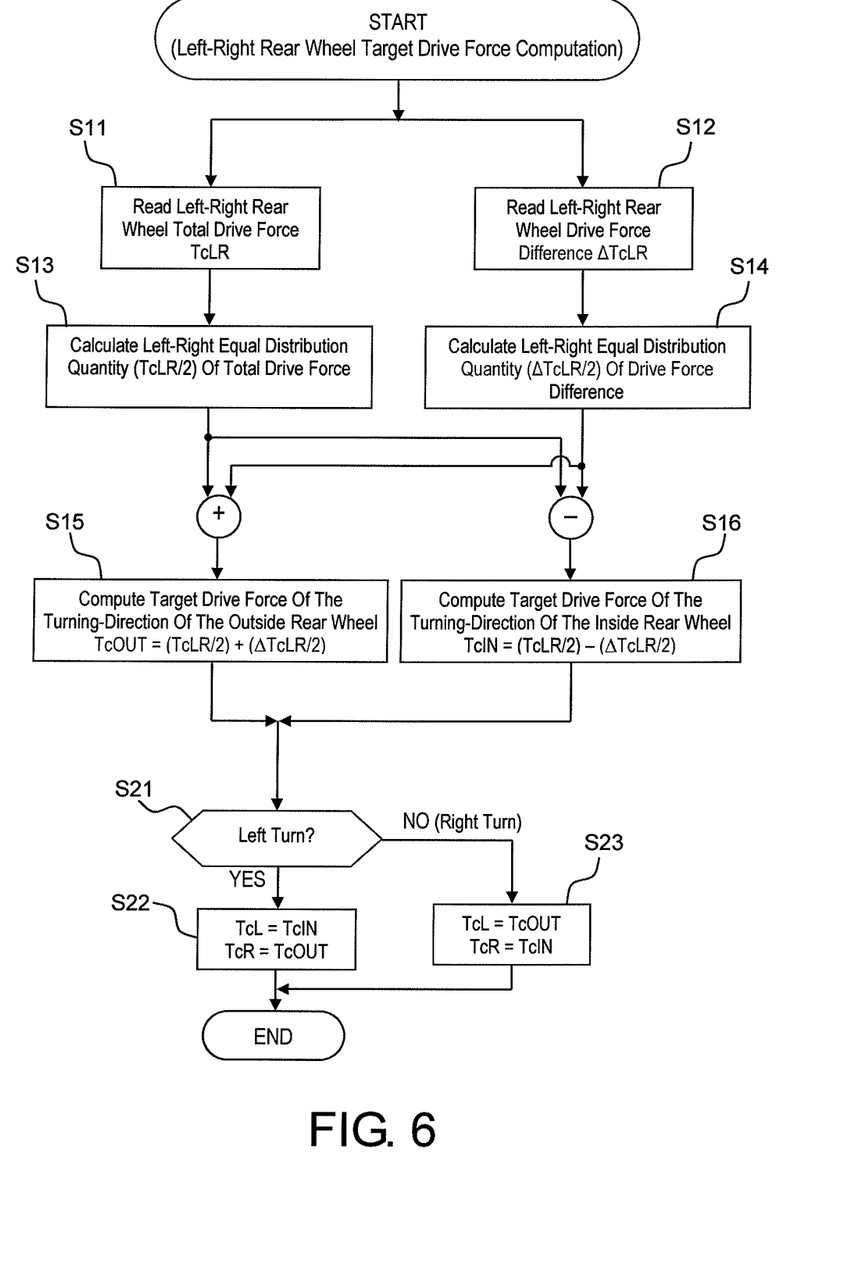
FIG. 6 is a flowchart showing a process by which the left-right rear wheel target drive force computing section shown in FIG. 2 computes left and right rear wheel target drive forces.

Based on the process shown in FIG. 6, the left-right rear wheel target drive force computing section 35 calculates a left rear wheel target drive force TcL and a right rear wheel target drive force TcR that satisfy both the left-right rear wheel total drive force TcLR and the left-right rear wheel drive force difference ΔTcLR, which are to be the revised final targets.

In step S11, the left-right rear wheel target drive force computing section 35 reads the final rear wheel total drive force TcLR revised by the previously explained feedback control, and in step S12, the left-right rear wheel target drive force computing section 35 reads the final left-right rear wheel drive force difference ΔTcLR revised by the feedback control.

In step S13, the left-right rear wheel target drive force computing section 35 calculates a left-right equal distribution quantity TcLR/2 of the rear wheel total drive force TcLR read in step S11, and in step S14, the left-right rear wheel target drive force computing section 35 calculates a left-right equal distribution quantity ΔTcLR/2 of the rear wheel drive force difference ΔTcLR read in step S12. In step S15, the left-right rear wheel target drive force computing section 35 adds the rear wheel drive force difference left-right equal distribution quantity ΔTcLR/2 to the rear wheel total drive force left-right equal distribution quantity TcLR/2 to calculate a target drive force TcOUT (=TcLR/2+ΔTcLR/2) of the turning-direction outside rear wheel. In step S16, the left-right rear wheel target drive force computing section 35 subtracts the rear wheel drive force difference left-right equal distribution quantity ΔTcLR/2 from the rear wheel total drive force left-right equal distribution quantity TcLR/2 to calculate a target drive force TcIN (=TcLR/2−ΔTcLR/2) of the turning-direction inside rear wheel.

Thus calculated, the target drive force TcOUT of the turning-direction outside rear wheel and the target drive force TcIN of the turning-direction inside rear wheel serve as a target drive force of the turning-direction outside rear wheel and a target drive force of the turning-direction inside rear wheel that achieve both the rear wheel total drive force TcLR and the rear wheel drive force difference ΔTcLR.

In step S21 and subsequent steps, the left-right rear wheel target drive force computing section 35 sets the left rear wheel target drive force TcL and the right rear wheel target drive force TcR based on the target drive force TcOUT of the turning-direction outside rear wheel and the target drive force TcIN of the turning-direction inside rear wheel as will now be explained. First, in step S21, the left-right rear wheel target drive force computing section 35 determines if the vehicle is undergoing a left turn or a right turn based on the steering angle θ and the yaw rate Φ.

If it is a left turn, then in step S22 the left-right rear wheel target drive force computing section 35 sets the inside wheel target drive force TcIN as the target drive force TcL of the left rear wheel (which is the turning-direction inside wheel) and sets the outside wheel target drive force TcOUT as the target drive force TcR of the right rear wheel (which is the turning-direction outside wheel). Conversely, if it is a right turn, then in step S23 the left-right rear wheel target drive force computing section 35 sets the outside wheel target drive force TcOUT as the target drive force TcL of the left rear wheel (which is the turning-direction outside wheel) and sets the inside wheel target drive force TcIN as the target drive force TcR of the right rear wheel (which is the turning-direction inside wheel).

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR set by the computing section 35 shown in FIG. 2 as explained previously.

Effects that are obtained with a four-wheel drive vehicle drive force distribution control according to the embodiment explained heretofore will now be explained.

(1) If the computing section 34c determines in step S14 of FIG. 3 that the over-steered state exists (|Δφos|), then in step S17 the computing section 34c sets the feedback control coefficient K1 for the rear wheel total drive force rTcLR to 0 and sets the feedback control coefficient K2 for the rear wheel drive force difference rΔTcLR to 0 such that the vehicle travels in a two-wheel drive state without transmitting a drive force to the rear wheels. Operational effects obtained as a result will now be explained.

In the over-steered state, the wheel loads of the turning-direction inside wheels decreases such that the inside rear wheel slips easily and cannot transmit a large drive force. However, in order to dissolve the over-steered state, it is necessary to increase the drive force of the inside rear wheel. When the over-steered state exists and the inside rear wheel cannot transmit a large drive force due to the decreased wheel load, drive slippage will occur at the inside rear wheel if the decreased wheel load is ignored and the drive force of the inside rear wheel is increased in an attempt to dissolve the over-steered state. In such a case, it will not be possible to dissolve the over-steered state and a problem of damaged turning stability of the vehicle will be incurred.

However, with this embodiment, a drive force is not transmitted to the rear wheel while the over-steered state exists. As a result, drive slippage of the inside rear wheel does not occur and the problem of damaging the turning stability of the vehicle can be avoided.

Furthermore, it is not necessary to switch to a two-wheel drive state in which a drive force is not transmitted to the rear wheels at all when an over-steered state occurs, as is done in the embodiment. Instead, it is acceptable to maintain the four-wheel drive state and set the coefficient K2 to 0 such that a drive force difference is not set between the left and right rear wheels, i.e., such that the drive force of the inside rear wheel is not increased in order to dissolve the over-steered state. In this way, the drive slippage of the inside rear wheel can be alleviated and the aforementioned problem of damaging the turning stability of the vehicle can be avoided to some extent. In short, it is acceptable to execute only the setting of K2 to 0 in step S17.

(2) If the computing section 34c determines in step S15 of FIG. 3 that the under-steered state exists (|Δφ>|Δφus|), then in step S18 the computing section 34c sets the feedback control coefficient K1 for the rear wheel total drive force rTcLR to 1 and sets the feedback control coefficient K2 for the rear wheel drive force difference rΔTcLR to 0 such that the vehicle remains in the four-wheel drive state with drive forces transmitted according to the computation results of the computing section 32. Meanwhile, the drive force distribution to the left and right rear wheels is set to be the same regardless of the computation result of the computing section 33. Operational effects obtained as a result will now be explained.

On a canted road that is slanted in a vehicle widthwise direction, if a driver is imposing a steering angle to counter-balance a vehicle yaw rate caused by the slant of the road surface (to prevent an actual yaw rate from occurring in the vehicle), then a comparison of the target yaw rate tφ found based on the steering operation and the actual yaw rate φ will yield a determination that the vehicle is in an under-steered state as indicated in step S15 of the embodiment because a yaw rate is not occurring even though the steering wheel is being turned. When it has been determined that an under-steered state exists, the conventional drive force distribution control increases the drive force of the steering direction outside wheel so as to generate a yaw rate equal to the target yaw rate from the state in which no yaw rate exists and, consequently, a yaw moment tending to cause the vehicle to ride up the canted road surface acts on the vehicle.

However, the driver operated the steering to counterbalance the vehicle yaw rate caused by the slant of the canted road surface, not to execute a turn. Therefore, it is a troublesome problem for the driver if the control imposes a yaw moment tending to cause the vehicle to ride up the canted road surface and changes the advancement path of the vehicle in a corresponding direction.

With this embodiment, if the computing section 34c determines in step S15 that the under-steered state exists (|Δφ|>|Δφus|), then in step S18 it sets K2=0 such that the drive force distribution is the same for the left and right rear wheels. As a result, a yaw moment tending to cause the vehicle to ride up the canted road surface does not act on the vehicle and the problem of the advancement path of the vehicle changing in a corresponding direction and troubling the driver can be solved.

Furthermore, when it determines that the under-steered state exists, the computing section 34c also sets K1=1 such that a drive force continues to be transmitted to the rear wheels. As a result, the excellent traction of four-wheel drive can be enjoyed while solving the aforementioned problem.

In the embodiment, as shown in FIG. 5, when the yaw rate deviation Δϕ exceeds the over-steering determination value Δϕos, the computing section 34c determines that the over-steered state exists and changes the rear wheel total drive force feedback control characteristic K1 from 1 to 0. Conversely, when the yaw rate deviation decreases to the over-steering determination value Δϕos, the computing section 34c determines that the neutral steering state exists and changes the rear wheel total drive force feedback control characteristic K1 from 0 to 1. However, from the standpoint of preventing a driver from experiencing an odd feeling, it is preferable to make these changes of the coefficient occur gradually in response to the yaw rate deviation Δϕ such that the rear wheel total drive force TcLR (see FIG. 2) does not change suddenly between 0 and the computation value rTcLR computed at the computing section 32.

The invention claimed is:

1. A four-wheel drive vehicle drive force distribution control apparatus comprising:
    a controller programmed to execute a distributed output of a total drive force to main drive wheels and subordinate drive wheels of a vehicle with a portion of a main wheel drive force for the main drive wheels being redirected to the subordinate drive wheels between a left subordinate drive wheel and a right subordinate drive wheel in accordance with a drive force distribution control, the controller including
        an under-steering determining section that determines whether the vehicle is in an under-steered state in which an actual turning behavior is insufficient to meet a target turning behavior computed based on a vehicle operating state; and
        an under-steering left-right wheel drive force difference control section that sets a drive force difference between the left and right subordinate drive wheels to 0 upon the under-steering determining section determining that the under-steered state exists.

2. A four-wheel drive vehicle drive force distribution control apparatus comprising:
    a controller programmed to execute a distributed output of a total drive force to main drive wheels and subordinate drive wheels of a vehicle with a portion of a main wheel drive force for the main drive wheels being redirected to the subordinate drive wheels between a left subordinate drive wheel and a right subordinate drive wheel in accordance with a drive force distribution control, the controller including
        an over-steering determining section that determines whether the vehicle is in an over-steered state in which an actual turning behavior is excessive with respect to a target turning behavior computed based on a vehicle operating state; and
        an over-steering left-right wheel drive force difference control section that sets a drive force difference between the left and right subordinate drive wheels to 0 upon the over-steering determining section determining that the over-steered state exists;
        an under-steering determining section that determines whether the vehicle is in an under-steered state in which an actual turning behavior is insufficient to meet a target turning behavior computed based on a vehicle operating state; and
        an under-steering left-right wheel drive force difference control section that sets a drive force difference between the left and right subordinate drive wheels to 0 upon the under-steering determining section determining that the under-steered state exists.

3. The four-wheel drive vehicle drive force distribution control apparatus according to claim 2, wherein
    the over-steering determining section determines that the over-steered state exists when the actual turning behavior is excessive with respect to the target turning behavior by an amount exceeding a dead zone.

4. The four-wheel drive vehicle drive force distribution control apparatus according to claim 2, further comprising
    an over-steering subordinate drive wheel drive force control section that sets the total drive force transferred from the main drive wheel to the subordinate drive wheel to 0 when the over-steering determining section determines that the over-steered state exists.

* * * * *